United States Patent
Martin

(10) Patent No.: US 10,569,701 B2
(45) Date of Patent: Feb. 25, 2020

(54) SYSTEMS AND METHODOLOGIES FOR CONTROLLING A VEHICLE LIGHT

(71) Applicant: Valeo North America, Inc., Troy, MI (US)

(72) Inventor: Patrick Martin, Columbus, IN (US)

(73) Assignee: Valeo North America, Inc., Troy, MI (US)

( * ) Notice: Subject to any disclaimer, the term of this patent is extended or adjusted under 35 U.S.C. 154(b) by 1 day.

(21) Appl. No.: 15/475,419

(22) Filed: Mar. 31, 2017

(65) Prior Publication Data

US 2018/0281668 A1 Oct. 4, 2018

(51) Int. Cl.
*B60Q 1/38* (2006.01)
*B60Q 1/26* (2006.01)
*H05B 33/08* (2006.01)
*B60Q 1/34* (2006.01)
*B60R 1/12* (2006.01)
*H05B 37/02* (2006.01)

(52) U.S. Cl.
CPC ........... *B60Q 1/38* (2013.01); *B60Q 1/2665* (2013.01); *B60Q 1/2696* (2013.01); *B60Q 1/343* (2013.01); *B60Q 1/382* (2013.01); *H05B 33/0845* (2013.01); *H05B 33/0848* (2013.01); *H05B 37/029* (2013.01); *B60R 1/1207* (2013.01)

(58) Field of Classification Search
CPC ........ B60Q 1/38; B60Q 1/343; B60Q 1/2665; B60Q 3/14; B60Q 3/18; B60Q 2300/14; B60Q 2300/142–144; B60Q 2300/12; B60Q 2300/122; H05B 33/0848; B60R 1/1207

See application file for complete search history.

(56) References Cited

U.S. PATENT DOCUMENTS

| | | | |
|---|---|---|---|
| 6,857,582 B1 | 2/2005 | Wang | |
| 8,398,284 B1* | 3/2013 | Dvorzsak | F21S 48/215 362/249.02 |
| 9,187,031 B1* | 11/2015 | Ovenshire | B60Q 1/26 |
| 9,555,737 B1* | 1/2017 | Huang | B60Q 1/38 |
| 2003/0231485 A1 | 12/2003 | Chien | |
| 2005/0062597 A1* | 3/2005 | Su | B60Q 1/2665 340/475 |
| 2005/0218837 A1 | 10/2005 | Zipf | |
| 2005/0247862 A1 | 11/2005 | Faytlin et al. | |
| 2006/0133103 A1* | 6/2006 | Muhlbaier | B60Q 1/2607 362/545 |
| 2010/0164394 A1* | 7/2010 | Liu | H05B 33/0818 315/287 |
| 2011/0181197 A1* | 7/2011 | Kanda | B60Q 1/38 315/268 |
| 2012/0025970 A1* | 2/2012 | Beach | B60Q 1/38 340/478 |

(Continued)

FOREIGN PATENT DOCUMENTS

CN 205140450 U 4/2016

*Primary Examiner* — Renan Luque
(74) *Attorney, Agent, or Firm* — Oblon, McClelland, Maier & Neustadt, L.L.P.

(57) ABSTRACT

A vehicle illumination system and method for controlling a vehicle light. The method includes receiving an input signal at a controller port; generating a control signal to activate the vehicle light based on both a rising and falling edge of the input signal in which the control signal activates an animation sequence when a falling edge is detected.

13 Claims, 8 Drawing Sheets

(56) References Cited

U.S. PATENT DOCUMENTS

| | | | |
|---|---|---|---|
| 2012/0086565 A1* | 4/2012 | Fritz | B60Q 1/2665 |
| | | | 340/425.5 |
| 2012/0326606 A1* | 12/2012 | Rice | B60Q 1/26 |
| | | | 315/77 |
| 2013/0127612 A1* | 5/2013 | Stadler | B60Q 1/34 |
| | | | 340/465 |
| 2017/0352274 A1* | 12/2017 | Kodama | B60Q 1/38 |
| 2018/0031203 A1* | 2/2018 | Lee | F21S 43/14 |
| 2018/0134211 A1* | 5/2018 | Aust | B60Q 1/0023 |

* cited by examiner

FIG. 6

| | Block 1 | Block 2 | Block 3 | Block 4 | Block 5 | Block 6 | Block 7 | Block 8 | Block 9 |
|---|---|---|---|---|---|---|---|---|---|
| T=0 ms | ▓ | ▓ | ▓ | ▓ | ▓ | ▓ | ▓ | ▓ | ▓ |
| T=18 ms | | ▓ | ▓ | ▓ | ▓ | ▓ | ▓ | ▓ | ▓ |
| T=36 ms | | | ▓ | ▓ | ▓ | ▓ | ▓ | ▓ | ▓ |
| T=54 ms | | | | ▓ | ▓ | ▓ | ▓ | ▓ | ▓ |
| T=72 ms | | | | | ▓ | ▓ | ▓ | ▓ | ▓ |
| T=90 ms | | | | | | ▓ | ▓ | ▓ | ▓ |
| T=108 ms | | | | | | | ▓ | ▓ | ▓ |
| T=126 ms | | | | | | | | ▓ | ▓ |
| T=144 ms | | | | | | | | | ▓ |

600

| | Block 1 | Block 2 | Block 3 | Block 4 | Block 5 | Block 6 | Block 7 | Block 8 | Block 9 |
|---|---|---|---|---|---|---|---|---|---|
| T=0 ms | | | | | | | | | |

602

SYSTEMS AND METHODOLOGIES FOR CONTROLLING A VEHICLE LIGHT

BACKGROUND

Automotive wiring systems are complex and interdependent with component designs and overall system requirements. Many automotive manufactures use wiring schemes that have been refined over years of production and are essentially set for lighting module suppliers. Automotive lights with personalized effects are becoming popular because they enhance the visual perception of lights of a vehicle such as a turn signal. However, such effects may require additional signal lines, cannot be realized due to set wiring schemes.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

According to an embodiment of the present disclosure, there is provided a method for controlling a vehicle light. The method includes receiving an input signal at a controller port; generating a control signal to activate the vehicle light based on both a rising and falling edge of the input signal in which the control signal activates an animation sequence when a falling edge is detected.

In one embodiment, the vehicle light is a turn signal.

In one embodiment, the vehicle light includes a plurality of light emitting diodes (LEDs).

In one embodiment, the animation sequence includes deactivating a first group of the plurality of LEDs, wherein each of the LED group includes at least one light emitting diode; and deactivating subsequently the other groups of LED groups successively until the plurality of LED group are all in an OFF state.

In one embodiment, the animation sequence is a fade out.

In one embodiment, the method further comprises activating the vehicle light in an ON state when a rising edge of the input signal is detected.

In one embodiment, an overall time period from the activating of the animation sequence until reaching the OFF state of the vehicle light ranges from 100 ms and 200 ms.

In one embodiment, the method further comprises determining a duty cycle of the input signal; and deactivating the animation sequence when the duty cycle of the input signal is outside a predetermined range.

In one embodiment, the vehicle light is a part of an outside mirror assembly.

In one embodiment, the vehicle light is a part of a taillight.

According to an embodiment of the present disclosure, there is provided a circuit. The circuit includes a microcontroller. The microcontroller is configured to generate a control signal based on both a rising edge and falling edge of an input signal in which the control signal activates an animation sequence of a vehicle light when a falling edge is detected.

According to an embodiment of the present disclosure, there is provided a vehicle illumination system. The vehicle illumination system includes a vehicle light and a driving device. The driving device is configured to control the vehicle light based on both rising and falling edge of an input signal received via a single input, in which the control signal activates an animation sequence of the vehicle light when a falling edge is detected.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 shows time table for a plurality of operation modes of the vehicle light;

DETAILED DESCRIPTION

Figure 1:
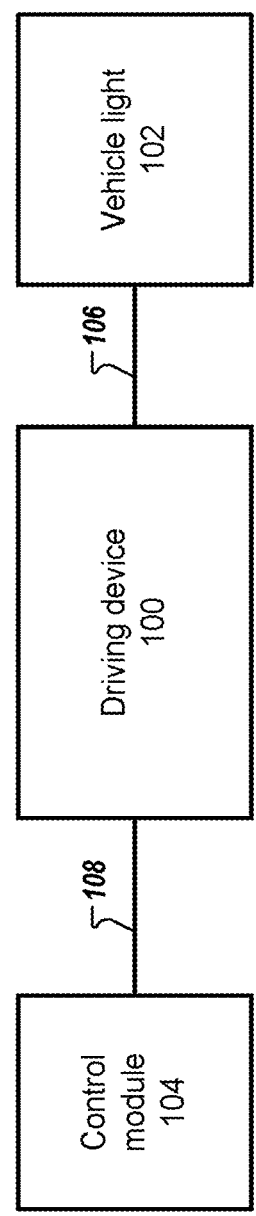
FIG. 1 is a block diagram of a vehicle illumination system according to one example.

Referring now to the drawings, wherein like reference numerals designate identical or corresponding parts throughout several views, the following description relates to a system and associated methodology for controlling a vehicle light such as a signal lamp.

Personalization of motor vehicles is an aspect of increasing importance among vehicle users. Sophisticated lighting patterns and/or changes in perceived brightness may be provided by a driving device (i.e., driver) of a vehicle light. Typically, additional hardware are included to control or enable a specific effect such as fade out. However, in vehicle lights having slim designs (e.g., taillights) there is no room for complex drivers. The driving device and associated methodologies described herein provide a high degree of robustness and diagnostic-ability required for safety critical applications, e.g., automotive turn signals.

Turn signal lighting systems are used in motor vehicles to indicate a travel direction and are alternatingly turned on or off within a flashing cycle. Each flashing cycle may include an active period during which the signal lamp illuminates and an inactive period during which the signal lamp remains dark. The flash frequency ranges hereby between 1 Hz and 2 Hz. Signal lamps approved for road traffic have to comply with certain regulations.

As noted in the Background, turn signals with personalized effects are becoming popular. For example, a "fade in" turn signal sequentially illuminates a series of lights to provide an animation effect. Typically the "fade in" sequence is activated at each rising edge of a control signal. In the case of a "fading out" turn signal, it is a concern to be able to meet regulations while the vehicle light, for example, light emitting diodes (LEDs) are being activated or are animated. If triggering is based of the incoming rising edge or positive travelling signal then the LEDs may fade out, tracer off, or otherwise be unpowered after the duration of a single period of the time signal. This results in liability to the designer and in a failure of homologation/regulation tests. For example, the vehicle light may not be "ON" for a period to satisfy the homologation/regulation standards. The duration before the vehicle light is activated may be configured to meet homologation/regulation standards when using the falling edge to activate the vehicle light. Thus, the control signal may be adjusted to satisfy various homologation/regulation standards (e.g., associated with various countries). For example, the "ON" time, the animation sequence, and/or system timing (i.e., frequency of the overall system) may vary in various regulatory markets such as Economic Commission for Europe (ECE) regulations, Society of Automotive Engineer (SAE), India, China Compulsory Certification (CCC), and Korea. Further, customer and end user satisfaction are enhanced with an adjustable control signal.

Figure 2:
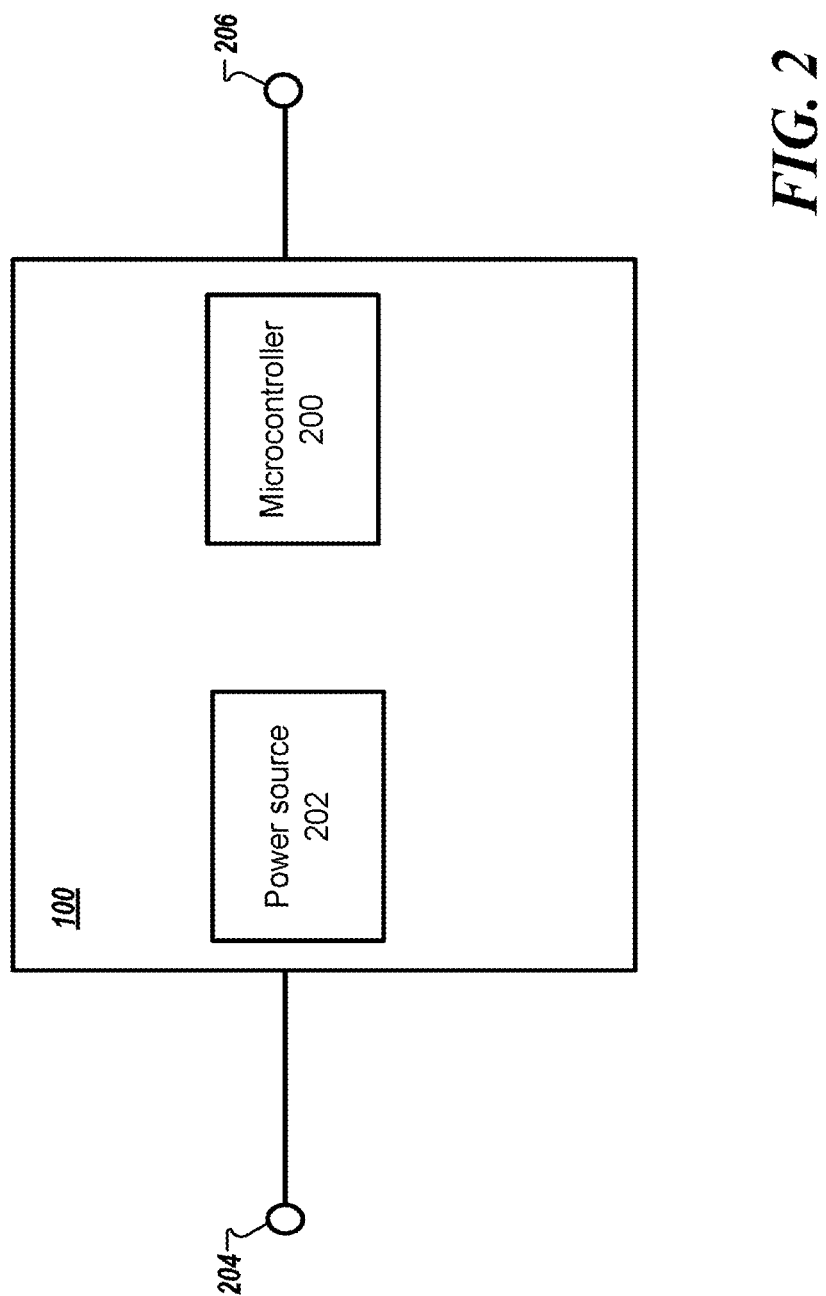
FIG. 2 is a block diagram of a driving device according to one example.

FIG. 1 is a block diagram of a vehicle illumination system according to one example. The vehicle illumination system may include a driving device 100, a vehicle light 102, and a control module 104. The driving device 100 is any driver that can accept a pulse-width modulation (PWM) or a square wave, and includes a microcontroller that can read the received signal and implement a two part trigger. In one example, the driving device 100 is Valeo driver FBD P10 commercially available. An exemplary driving device is shown in FIG. 2.

The vehicle light 102 is connected to the driving device 100 by line 106. The driving device 100 is operable so to generate a signal to control the light source 102 and enable an animation sequence such as fade out.

The vehicle light 102 may be of various types and styles. The vehicle light 102 may include one or more light sources. For example, the vehicle light 102 may include one or more LEDs. The number of light sources is not limited to a specific number. The light sources may be arranged in various ways according to design needs. For example, the light sources may be in a horizontal direction.

In one embodiment, the vehicle light 102 is a series of diode lamps such as light emitting diodes (LEDs), superluminescent diodes (SLDs), organic light emitting diodes (OLEDs), or the like, having desired monochromatic and illumination characteristics. The series of LEDs may include between six and ten LEDs. The LEDs may be of various colors. The vehicle light 102 may be a headlight, a taillight, a turn lamp including a LED running light (i.e., tracer). The vehicle light 102 may be part of a light assembly. For example, the vehicle light may be installed in a taillight of a vehicle. In one example, the vehicle light 102 may be part of an outside mirror assembly of the vehicle to be lighted up (turned on) to show the change in driving direction.

The series of LEDs may be sequentially turned off/on. Sequential turn off of the LEDs may be from left to right or right to left. In addition to the sequential sweep across the LEDs the total emitted brightness may also be adjusted. The vehicle light 102 is supplied with the on-board voltage of the vehicle. The on-board voltage is usually between 9 and 16 volts.

The control module 104 may be a body control module (BCM) for activating and controlling various systems (e.g., a lighting system, an alarm system, a map and positioning system, and the like) in a vehicle. The control module 104 may be connected to the driving device 100 via a serial bus line such as local interconnect network (LIN), controller area network (CAN). For example, the control module 104 may be connected to the driving device 100 via line 108. The control module 104 may be coupled to an operator interface. The operator interface may include switches available to the operator or passenger of the vehicle for controlling the various systems. Thus, for each switch activation in the operator interface, an output signal is generated. For example, when the operator of the vehicle activates the switch associated with the vehicle light 102, an output signal on line 108 is generated.

The control module 104 generates a PWM signal having a desired duty factor based on predefined values associated with the ON-OFF settings of the vehicle light 102. At the rising edge of the PWM signal, the vehicle light 102 can be activated through driver outputs, at the falling edge an animation sequence of the vehicle light (e.g., tracer off) can be activated as described further below. This allows for dynamic vehicle illumination systems (e.g., LED systems), increasing visual aesthetics while confirming to SAE (Society of Automotive Engineers) regulations. In particular, use of the falling edge to start the fade out sequence permits and adaptable tracer without the need for an additional signal line to control the activation of the fade out signal.

FIG. 2 is a block diagram of a driving device 100 according to one example. The driving device 100 may include a microcontroller 200 and a power source 202. The driving device 100 has an input terminal 204 to receive a signal from the control module 104 which in turn represents a control signal for the vehicle light 102 via output terminal 206. The microcontroller 200 is configured to detect the rising edge and the falling edge of the received signal from the control module 104. For example, to detect the rising edge of a received signal, the microcontroller 200 may compare the voltage value of the received signal with a predetermined low threshold value. When the voltage of the received signal is above the predetermined low threshold value, a rising edge is detected.

In one example, when a person in the vehicle (e.g., the operator of the vehicle) actuates the turn signal indicator, the control module 104 generates a PWM signal or a square wave as a control signal of the driving device 100 via the input terminal 204. The period of the PWM signal may correspond to the flash frequency with which the vehicle light 102 is intended to flash for indication of the travel direction. The vehicle light 102 is activated at the rising edge of the PWM signal of the control signal via the line 108. At the falling edge (descending flank) of the PWM of the control signal 108, the microcontroller 200 may generate an activating signal such a signal to activate a fade out. Thus, the vehicle light 102 is not directly turned off on the falling edge of the PWM signal by the control module 104. In one example, the activating signal is configured to control one or more LEDs. This flashing cycle repeats with the next ascending edge of the PWM signal.

Figure 3:
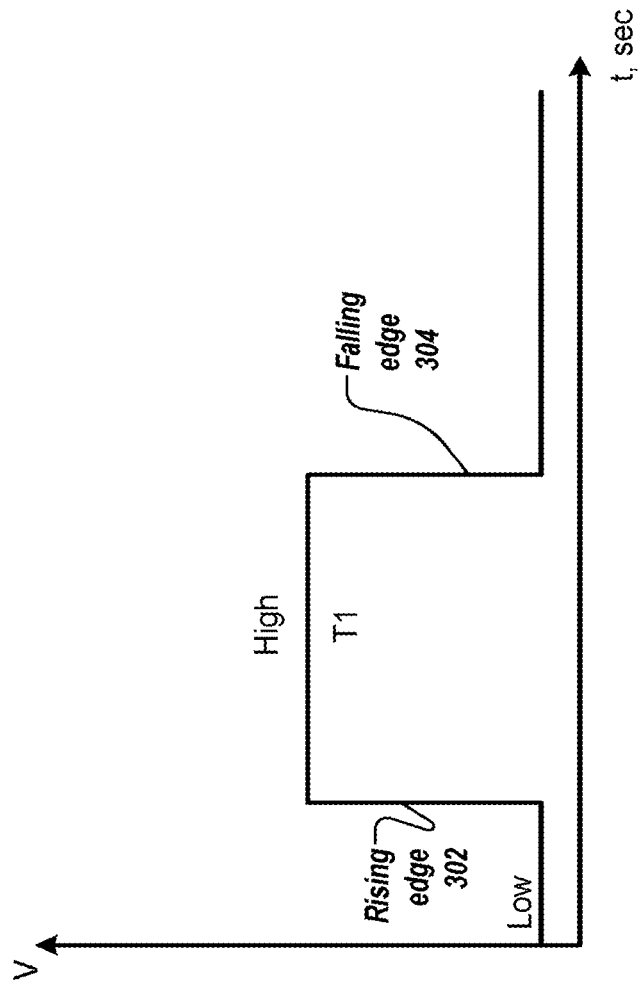
FIG. 3 is a signal flow diagram illustrating an input of the driving device according to one example.

FIG. 3 is a signal flow diagram illustrating an input of the driving device 100 according to one example. The duty cycle has cycle start times corresponding with rising edges 302 and cycle end times corresponding with falling edges 304. The time period between the rising edges and the falling edges is represented by T1. The time period T1 may be based on the regulation standard for illumination time of a turn signal, for example. When the microcontroller 200 or other edge recognition circuit detects a falling edge 304 in the received signal, then it activates an animation sequence (e.g., tracer) of the vehicle light 102.

Figure 4:
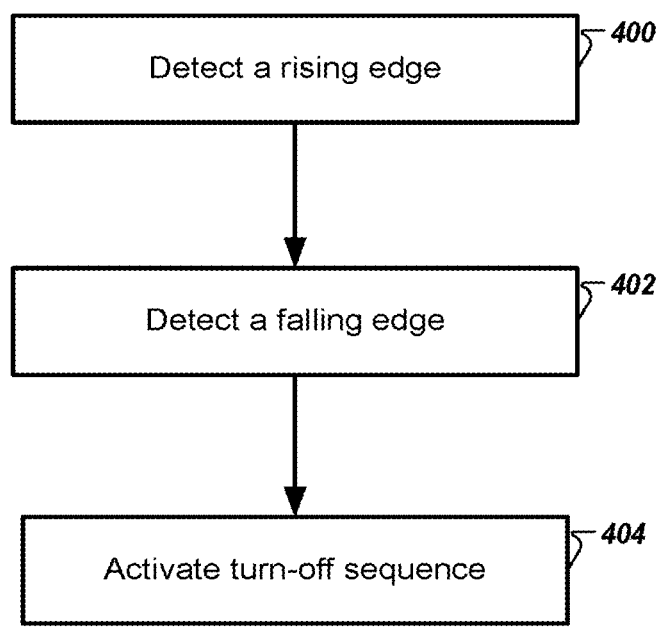
FIG. 4 is a flowchart that shows a method for controlling a vehicle light according to one example.

FIG. 4 is a flowchart that shows a method for controlling the vehicle light 102 according to one example. In one example, the method may be realized by the driving device 100 described in relation to FIG. 2.

At 400, the microcontroller 200 may detect a rising edge of an input signal. The vehicle light 102 is turned on. For example, all LEDs in the light vehicle 102 are powered on or active.

At 402, a falling edge or negative traveling signal is detected by the microcontroller 200. The duration between the rising edge and the falling edge is a preset amount of time. In one implementation, the falling edge is effected by the control module 104 of FIG. 1. The preset amount of time is defined by regulations and meets homologation regulatory standards.

At 404, the turn off sequence is activated. For example, a trace off or fade out may be activated by the microcontroller 200 of FIG. 2. Thus, the microcontroller 200 can read an input signal and determine whether the input signal is "high" or "low". Then, the microcontroller 200 determines whether the tracer stays OFF or ON based on the determination.

In one implementation, the vehicle light 102 may include LED groups. Each LED group may include one or more LEDs. When the microcontroller 200 detects a falling edge of the incoming signal, a first group of LEDs may be turned off. Then, each of the other groups of the LED groups is turned off successively until all the LEDs are in an OFF state. Then, all the group of LEDs may be activated when another rising edge is detected. The cycle of activating and deactivating the LEDs is repeated based on a predetermined flashing frequency of the vehicle light. The overall time period for deactivating may vary based upon customer request, aesthetic design, and the "ON" time. In one example, the overall time period from deactivating the first group of LEDs until deactivating all LEDs (i.e., all LEDs are in an OFF state) ranges from 100 ms to 200 ms.

In one implementation, the animation sequence may be a fade-out. Thus, once the falling edge is detected the brightness of the vehicle light 102 is gradually decreased. The time period from start of the fade-out until the vehicle light 102 is in an OFF state may range from 100 ms to 200 ms.

Figure 5:
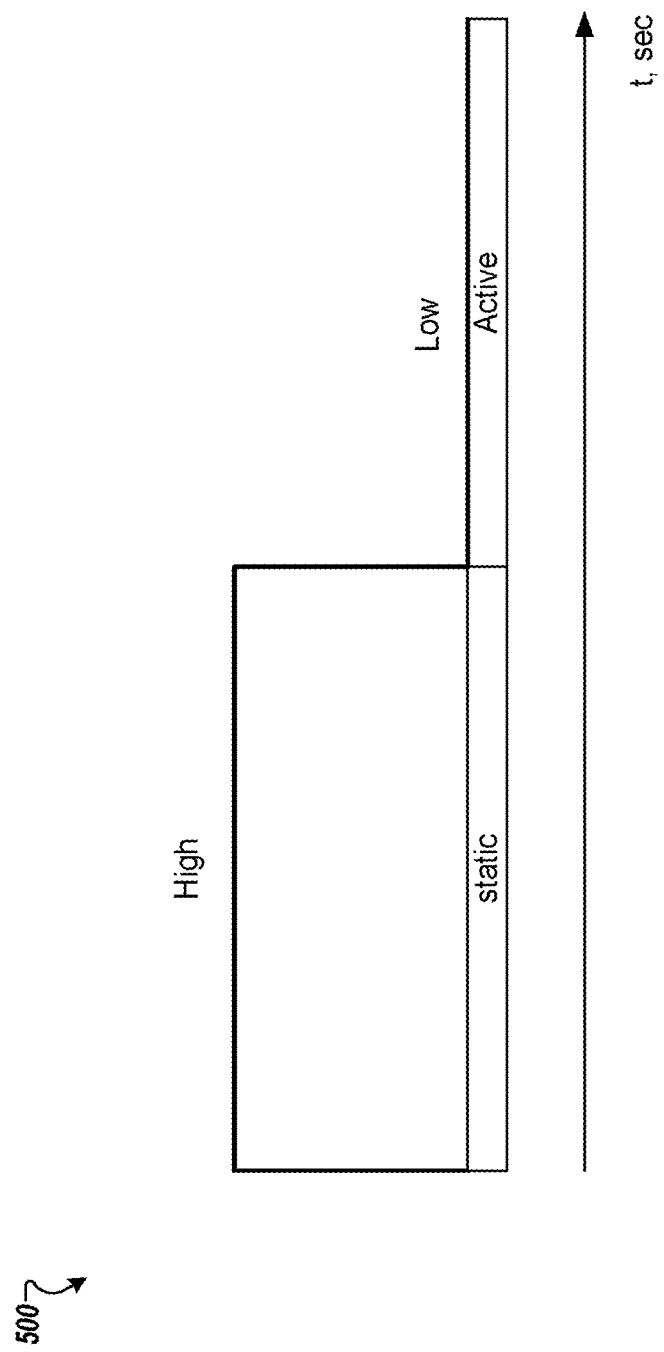
FIG. 5 is a signal flow diagram for a turn indicator according to one example.

FIG. 5 is a signal flow diagram 500 for a turn indicator according to one example. When the received signal is high, the turn indicator is static. When the falling edge is detected, an animation sequence is activated. For example, the one LED may fade out and/or the plural LEDs may trace out. The vehicle light 102 is maintained in an ON state for a predetermined time period. For example, the predetermined time period ranges from 400 ms to 750 ms in a SAE regulatory environment assuming one "flash" or "on-and-off cycle" every second. In one example, the signal as static is activated at least 50 ms before the activation of the animation sequence.

Using the microcontroller 200, various cases can be defined for the high signal input. For example, operation modes may be associated with hazardous driving conditions (e.g., weather) or other hazards. The microcontroller 200 may switch between different operation modes based on an enable signal activated by the operator of the vehicle or automatically by an advanced driver assistance system (ADAS) of the vehicle.

FIG. 6 shows timetables for exemplary operation modes of the vehicle light. Table 600, 602 refers to LED block cells, nine LED block cells are shown but it is contemplated and within the scope of this disclosure that more or fewer LED block cells may be used.

Table 600 the shaded block are the "ON". Table 600 may be stored in a parametric way. The times are exemplary. Table 602 is de-activated by the enable signal, all the blocks are switched OFF simultaneously, for example, during a hazard mode.

In one implementation, when the duty cycle of the signal received by the driving device is 50%, the animation sequence is activated on the falling edge of the received signal. For example, the LEDs may be operated as shown in table 600.

In one implementation, when the duty cycle of the signal is less than 30% a fast flash mode is recognized by the microcontroller 200. The microcontroller 200 disables the animation of the vehicle light 102.

In one implementation, when the duty cycle of the signal is greater than 50%, the microcontroller 200 disables the animation and a regular turn indicator is engaged.

In one implementation, when the duty cycle of the signal has a value between 30 to 50%, a hazard mode recognized is recognized by the microcontroller 200 and the animation is disabled.

Figure 7:
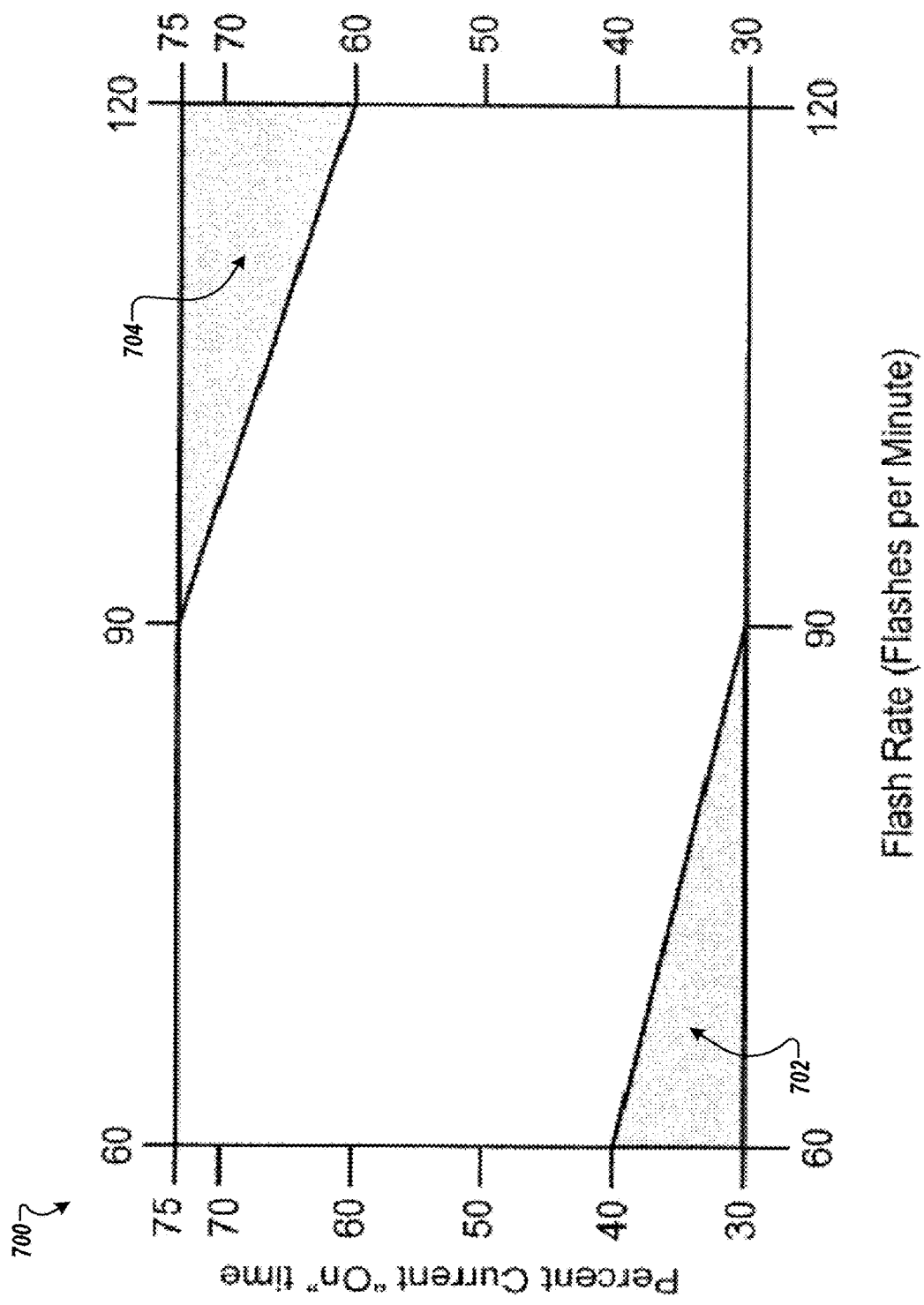
FIG. 7 is a schematic that illustrates requirements of flashing times for turn signals in North America.

FIG. 7 illustrates the range of flash rates for a turn signal allowed in North America. During a homologation/regulatory test, the light output is measured over a predetermined time. Schematic 700 shows the duty cycle (percent current "On" time" for multiple flash rates (flashes per minute). The percent current "ON" time (y-axis) represents the "static" or "constant" light output need for a turn indicator in North America. In the flash rate (x-axis), 60 represents a single "flash" or "on-and-off cycle" per second up to 120 (i.e., 2 flashes every second). Some combinations of flashing speed and "ON" time are not allowed, such as indicated by areas 702, 704 in schematic 700. For example, a turn indicator that flashes once per second may be "ON" for a minimum of 400 ms but not more than 750 ms. Schematic 700 is used as a reference during design and development of custom turn sequences with respect to the regulatory requirements.

A system which includes the features in the foregoing description provides numerous advantages to users. In particular, the use of falling edge activation to trigger animation allows for a very dynamic system without the need of additional components (e.g., pins, signals, inputs). In addition, the system and methodology described herein provide an adoptable tracer that can be disabled for hazards, fast flash, internal issues, or the like. The vehicle light can pass homologation tests.

Figure 8:
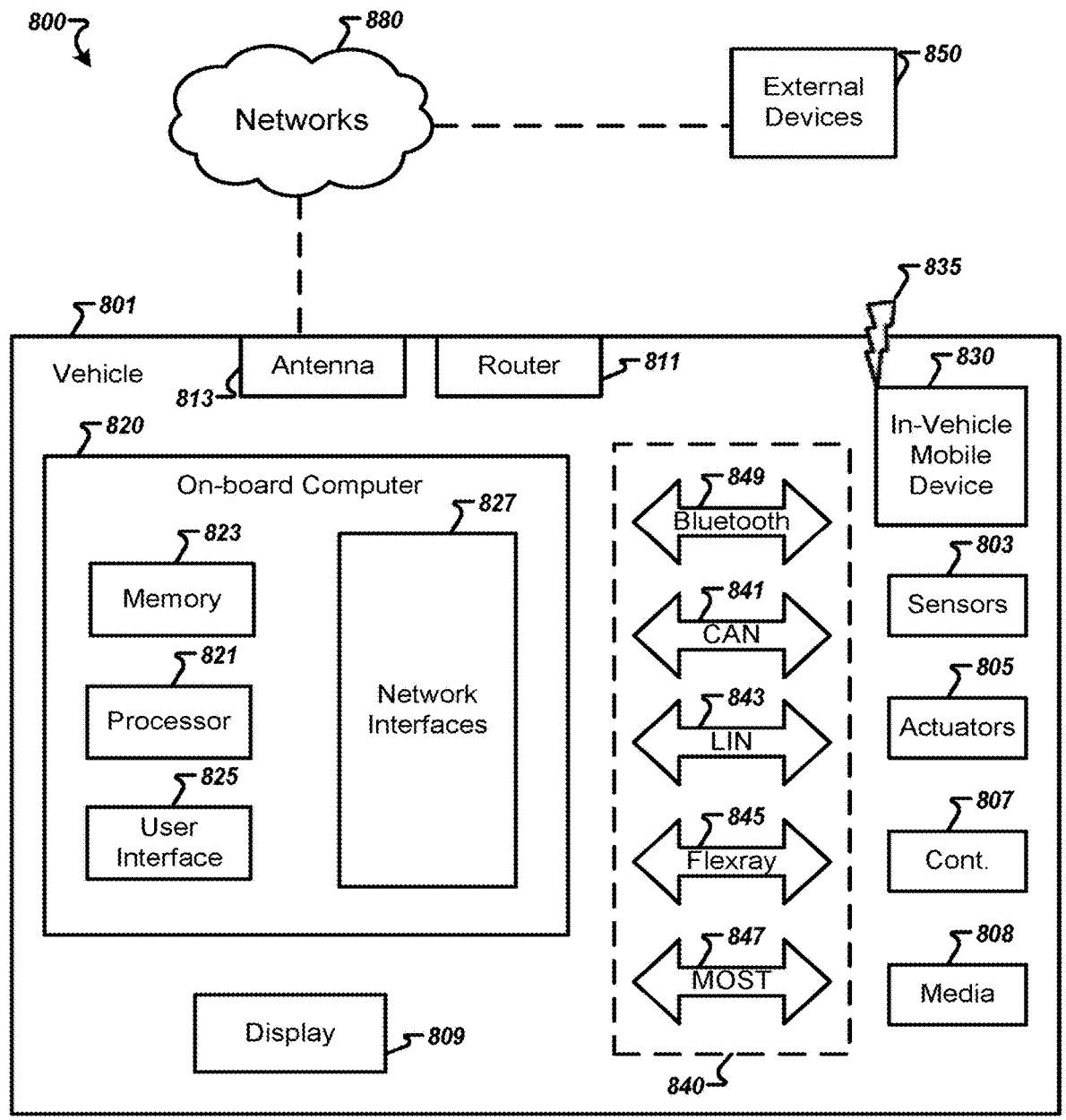
FIG. 8 is a simplified block diagram of a vehicle environment in which embodiments of the invention disclosed herein may be implemented.

FIG. 8 is a simplified block diagram of a vehicle environment 800 in which embodiments of the invention disclosed herein may be implemented. The vehicle environment 800 includes a vehicle 801 in communication with one or more external devices 850 by way of one or more external networks 880. Vehicle 801 also includes various internal networks 840 for interconnecting several vehicle devices within the vehicle as will be discussed below. The vehicle environment 800 may also include one or more in-vehicle mobile device 830. External devices 850 include any device located outside the vehicle 801 such that the external device must communicate with the vehicle and its devices by an external network 880. For example, the external devices may include mobile devices, electronic devices in networked systems (e.g., servers or clients in a local area network (LAN), etc.), on board computers of other vehicles etc. In-vehicle mobile devices 830 are devices which are located within, or in the vicinity of the vehicle 801 such that the in-vehicle mobile device can communicate directly with internal networks 840 of the vehicle 801. In-vehicle mobile devices 830 may also connect with external networks 880 as discussed below.

Vehicle 801 includes vehicle devices integral with or otherwise associated with the vehicle 801. In the embodiment of FIG. 8, vehicle devices include one or more sensors 803, one or more actuators 805, one or more control units 807, one or more media systems 808, one or more displays 809, one or more routers 811, one or more antenna 813, and one or more on board computers 820. The one or more on board computers 820 may correspond to the control module 104. The one or more on board computers may generate signals having a desired duty factor to control one or more vehicle lights. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 801.

Sensors 803 detect various conditions within (or in the immediate vicinity of) the vehicle 801. For example, sensors 803 may be temperature sensors, photosensors, position sensors, speed sensors, angle sensors or any other sensor for detecting a diagnostic condition or other parameter of the vehicle 801 or its ambient environment. Sensors 803 may be passive or "dumb" sensors that provide an analog representative of the sensed parameter, or so called "smart" sensors with integrated memory and digital processing capability to analyze the parameter sensed within the sensor itself. Data from sensors 803 may be used to activate a hazard mode associated with the vehicle light as described previously herein. Actuators 805 cause motion of some mechanical element of the vehicle in response to a control signal. For example, actuators 805 may be hydraulic actuators, pneumatic actuators or electrical/electronic actuators such as a stepper motor. Actuators 805 may be used to move vehicle lighting devices to implement intelligent light, for example.

Actuators 805 may also be "dumb" devices that react to a simple analog voltage input, or "smart" devices with built-in memory and processing capability. Actuators 805 may be activated based on a sensed parameter from sensors 803, and one such sensed parameter may be a physical position of the actuator 803 itself. Thus, the sensors 803 and actuators 805 may be connected in a feedback control loop for diagnostic detection and control of the vehicle 801.

Control units 807 include any embedded system, processor, electronic control unit (ECU) or microcontroller. Control unit 807 may be dedicated to a specific region or function of the vehicle 801. For example, control unit 807 can provide memory and control logic functions for several dumb devices, such as passive sensors 803 and actuators 805. In one embodiment, control unit 807 is an ECU dedicated for controlling one or more lighting devices, for example vehicle light 102, according to embodiments disclosed herein. Typically, numerous ECUs, with different embedded software, may be found in a single automobile and may communicate via internal networks as discussed below.

On-board computer 820 is a vehicle device for providing general purpose computing functionality within the vehicle 801. The on-board computer 820 typically handles computationally intensive functions based on software applications or "apps" loaded into memory. On-board computer 820 may also provide a common interface for different communication networks in the vehicle environment 800. On-board computer 820 includes one or more processor 821, one or more memory 823, one or more user interface 825 (e.g., the operator interface described previously herein), and one or more network interface 827. One or more display 809 and one or more router 811 may be an integral part of the on board computer 810, or distributed in the vehicle and associated with the on-board computer and other vehicle devices. Separate displays 809 may be provided in suitable locations for access by a driver and passengers in the vehicle 801.

On-board computer 820, and other associated or integrated components such as vehicle devices can include one or more memory element 823 for storing information to be used in achieving operations associated with control of one or more vehicle lights as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 800 could be provided in any database, register, table, cache, queue, control list, or storage structure, based on particular needs and implementations, all of which could be referenced in any suitable timeframe.

In example embodiments, the operations for controlling a vehicle light may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 823) can store data used for the operations described herein. This includes the memory elements being able to store software, logic, code, or processor instructions that are executed to carry out the activities described in this Specification.

Processor 821 can execute software or algorithms to perform activities to enable control of lighting devices disclosed herein. A processor 821 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 8 may be communicatively coupled to one another by one or more suitable communications medium (wired, wireless, optical) that provides a pathway for electronic communications. Any element in FIG. 8 may act as a network node in communication with any other element of FIG. 8 also acting as a network node. Any suitable network messaging protocol, network topology or network geographic scope may be included in the vehicle environment 800. Thus, embodiments of on-board computer

820 may include one or more distinct interfaces, represented by network interfaces 827, to facilitate communication via the various networks (including both internal and external networks) described herein. Such network interfaces 827 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 827, may include physical ports (e.g., Ethernet, USB, HDMI, etc.), interfaces for wired and wireless internal subsystems, and the like. Similarly, each of the nodes of vehicle environment 800 can also include suitable interfaces for receiving, transmitting, and/or otherwise communicating data or information in the vehicle environment 800.

Multiple internal vehicle networks represented by 840 may exist in the vehicle 801 to provide communication pathways to various vehicle devices distributed throughout the vehicle 801. An internal vehicle network 840 is a collection of nodes, such as vehicle devices, integrated with or otherwise linked to the vehicle and interconnected by communication means. Vehicle networks 840 typically include hard wired bus type networks, each providing communication pathways to particular vehicle devices distributed throughout a vehicle. FIG. 8 shows four examples of such hard wired networks: Controller Area Network (CAN) 841, Local Internet Network (LIN) 843, Flexray bus 845, and Media Oriented System Transport (MOST) network 847.

CAN bus 841 uses a message based protocol, designed for and typically used by automotive applications. The CAN bus 841 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 841 may connect a transmission sensor and an energy sensor to a main engine controller, and a different CAN bus may connect the main engine controller and a main body controller to on-board computer 820. LIN network 843 may be used to sense external conditions such as light, or to control small mechanisms such as door locking systems. For example, LIN bus 843 may connect a driver's seat actuator, temperature controls, and windshield wiper actuators to a main body controller of a CAN bus. The vehicle light described herein may be controlled by a hardwire (e.g., direct wire, power wire, sensing or signal wire). In one implementation, the vehicle light is controlled by the LIN or CAN network and the hardwire to achieve a certain level of redundancy to satisfy safety requirements.

Flexray bus 845 is typically a dedicated network for hard real-time controllers, used for drive-by-wire and/or brake-by-wire applications in which information from the engine and/or wheels of the vehicle 801 is collected and transmitted to appropriate applications and/or data repositories. For example, Flexray bus 845 may connect a chassis module of the vehicle 801 to on-board computer 820 through an appropriate interface, and/or may connect brakes and electronic stability control (ESB) to the chassis module attached to Flexray 845. MOST network 847 can also be found in vehicles for transmitting audio, video, and voice on fiber optics. MOST buses 847 can connect media system 808, to on-board computer 820 through appropriate interfaces, and/or connect a reversing camera and a navigation system to an intermediate device which is connected to computer by MOST bus 847.

Other hard wired internal networks such as Ethernet may be used to interconnect vehicle devices in the vehicle. Further, internal wireless networks 849, such as near field communications, Bluetooth, etc. may interconnect vehicle devices.

External networks 880 may be accessed from vehicle 801 by vehicle devices and in-vehicle mobile devices 830 when a communication link 835 is available. In-vehicle mobile devices 830 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 800. Data, may be any type of numeric, voice, video, or script data, or any type of source or object code, or any other suitable information in any appropriate format that may be communicated from one point to another in electronic devices and/or networks. A vehicle router 811 may also be used to access external network infrastructure within range of the antenna 813 of vehicle 801.

Some form of wireless communication is needed to achieve external network connectivity from vehicle 801. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 800 via some network, and such communication may be initiated through any suitable device such as, in-vehicle mobile device 830, display 809, user interface 825, or external devices 850, for example to activate a mode of operation of the vehicle light 102.

In-vehicle mobile devices 830, and mobile devices external to vehicle 801, may communicate with on-board computer 820 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 820 through a USB cable or wireless network when, for example, the external mobile device is a diagnostic tool used by a mechanic for servicing vehicle 801.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims. In particular, one skilled in the art will understand that the invention disclosed herein can be applied to meet could be applied in accordance with Federal Motor Vehicle Safety Standards (FMVSS) No. 108, as well as corresponding regulations in Europe, Japan, China and other parts of the world.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for controlling a turn signal, the method comprising:
   receiving a single pulse-width modulation input signal having a period associated with a flash frequency of the turn signal at a controller port of a microcontroller;
   generating, via the microcontroller, a first control signal at a rising edge of the single pulse-width modulation input signal and a second control signal other than the first control signal at a falling edge of the single pulse-width modulation input signal;
   determining a duty cycle of the single pulse-width modulation input signal; and
   recognizing a hazard mode, deactivating an animation sequence for a plurality of light emitting diodes (LEDs), and engaging a regular turn indicator by turning off all of the plurality of LEDs simultaneously when the duty cycle of the single pulse-width modulation input signal has a value between 30% and 50%,
   wherein the first control signal turns on all of the LEDs included in the turn signal and the second control signal activates the animation sequence to turn off all of the plurality of LEDs in a sequential sweep across the plurality of LEDs from right to left or from left to right.

2. The method of claim 1, wherein the animation sequence includes:
   deactivating a first LED group of the plurality of LEDs, wherein the first LED group includes two or more light emitting diodes; and
   deactivating subsequently other LED groups of a plurality of LED groups successively until the plurality of LED groups are all in an OFF state.

3. The method of claim 1, wherein the animation sequence is a fade out.

4. The method of claim 1, wherein an overall time period from the activating of the animation sequence until reaching an OFF state of the plurality of LEDs ranges a time period from 100 ms to 200 ms.

5. The method of claim 1, wherein the turn signal is a part of an outside mirror assembly.

6. The method of claim 1, wherein the turn signal is a part of a taillight.

7. A circuit of a vehicle lighting system comprising:
   a microcontroller configured to
   generate a first control signal at a rising edge of a single pulse-width modulation input signal having a time period associated with a flash frequency and a second control signal other than the first control signal at a falling edge of the single pulse-width modulation input signal;
   determine a duty cycle of the single pulse-width modulation input signal; and
   recognize a hazard mode, deactivate an animation sequence for a plurality of light emitting diodes (LEDs), and engage a regular turn indicator by turning off all of the plurality of LEDs simultaneously when the duty cycle of the single pulse-width modulation input signal has a value between 30% and 50%,
   wherein the first control signal turns on the plurality of LEDs included in a turn signal and the second control signal activates the animation sequence to turn off the plurality of LEDs in a sequential sweep across the plurality of LEDs from right to left or from left to right.

8. A vehicle illumination system, comprising:
   a turn signal; and
   a driving device configured to
   generate a first control signal at a rising edge of a single pulse-width modulation input signal having a time period associated with a flash frequency and a second control signal other than the first control signal at a falling edge of the single pulse-width modulation input signal,
   determine a duty cycle of the single pulse-width modulation input signal, and
   recognize a hazard mode, deactivate an animation sequence for a plurality of light emitting diodes (LEDs), and engage a regular turn indicator by turning off all of the plurality of LEDs simultaneously when the duty cycle of the single pulse-width modulation input signal has a value between 30% and 50%, wherein the first control signal turn on all of the plurality of LEDs included in the turn signal and the second control signal activates the animation sequence to turn off all of the plurality of LEDs in a sequential sweep across the plurality of LEDs from right to left or from left to right.

9. The vehicle illumination system of claim 8, wherein the animation sequence includes:
   deactivating a first LED group of the plurality of LEDs, wherein the first LED group includes at least one light emitting diode; and
   deactivating subsequently other groups of a plurality of LED groups successively until the plurality of LED groups are all in an OFF state.

10. The vehicle illumination system of claim 8, wherein the animation sequence is a fade out.

11. The vehicle illumination system of claim 8, wherein an overall time period from the activating of the animation sequence until reaching an OFF state of the plurality LEDs ranges from 100 ms to 200 ms.

12. The vehicle illumination system of claim 8, wherein the turn signal is a part of an outside mirror assembly.

13. The method of claim 1, wherein the animation sequence is disabled when a duty cycle of the single pulse-width modulation input signal is less than 30%.

* * * * *